(12) United States Patent
Kinoshita

(10) Patent No.: US 7,215,113 B2
(45) Date of Patent: May 8, 2007

(54) POSITION DETECTING APPARATUS FOR ACTUATOR AND VARIABLE VALVE LIFT MECHANISM FOR INTERNAL COMBUSTION ENGINE

(75) Inventor: Yasuo Kinoshita, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 47 days.

(21) Appl. No.: 11/095,519

(22) Filed: Apr. 1, 2005

(65) Prior Publication Data
US 2005/0258823 A1    Nov. 24, 2005

(30) Foreign Application Priority Data
May 21, 2004    (JP)    ............... 2004-152337

(51) Int. Cl.
G01B 7/14    (2006.01)
(52) U.S. Cl. .............. 324/207.24; 324/207.2; 324/207.21; 324/207.25
(58) Field of Classification Search ............ None
See application file for complete search history.

(56) References Cited

U.S. PATENT DOCUMENTS 4,989,329 A * 2/1991 Pullen ............... 33/1 PT
5,742,161 A * 4/1998 Karte ............... 324/207.16
5,955,881 A * 9/1999 White et al. ......... 324/207.2
6,411,082 B2 * 6/2002 Glasson ............. 324/207.25
6,633,157 B1   10/2003 Yamaki et al.

FOREIGN PATENT DOCUMENTS

| DE | 10003129 | * 8/2001 |
| JP | 2002-206423 | 7/2002 |
| JP | 2002-213219 | 7/2002 |
| JP | 2004-48875 | 2/2004 |

OTHER PUBLICATIONS

Chinese Office Action dated Sep. 29, 2006 with English Translation thereof.

* cited by examiner

Primary Examiner—Jay M. Patidar
(74) Attorney, Agent, or Firm—Kenyon & Kenyon LLP (57) ABSTRACT

A position detecting apparatus for an actuator includes a linear movement mechanism in which a magnet is provided; a coil which is provided so as to face the magnet such that a magnetic field is formed between the coil and the magnet; and a drive shaft which is connected to the linear movement mechanism through a ball screw, and which is linearly moved in response to rotational movement of the rotor, the rotational movement being caused by energizing the coil; and a magnetic flux detection sensor which detects a change in magnetic flux of the magnet, the change being caused by the rotational movement of the rotor, and which obtains an amount of linear movement of the drive shaft based on the detected change in the magnetic flux.

8 Claims, 7 Drawing Sheets

POSITION DETECTING APPARATUS FOR ACTUATOR AND VARIABLE VALVE LIFT MECHANISM FOR INTERNAL COMBUSTION ENGINE

INCORPORATION BY REFERENCE

The disclosure of Japanese Patent Application No. 2004-152337 filed on May 21, 2004, including the specification, drawings and abstract is incorporated herein by reference in its entirety.

BACKGROUND OF THE INVENTION

1. Field of the Invention

The invention generally relates to a position detecting apparatus for an actuator, and a variable valve lift mechanism for an internal combustion engine, which includes the position detecting apparatus. More particularly, the invention relates to a position detecting apparatus for an actuator which converts rotational movement to linear movement and outputs the linear movement, and a variable valve lift mechanism for an internal combustion engine, which includes the position detecting apparatus.

2. Description of the Related Art

With regard to a position detecting apparatus for an actuator, for example, Japanese Patent Application Publication No. JP (A) 2004-48875 discloses an abnormality detecting apparatus for a motor drive system, which can detect an abnormality of a sensor with a simple configuration. The motor drive system disclosed in the Japanese Patent Application Publication No. JP (A) 2004-48875 includes a drive shaft which is connected to an output shaft of a motor through plural gears and ball screws, and which is linearly moved in response to rotation of the output shaft. In the motor drive system, a displacement amount sensor which detects a displacement amount in an axial direction of the drive shaft is provided.

Also, Japanese Patent Application Publication No. JP (A) 2002-213219 discloses a variable valve drive apparatus for an internal combustion engine, which is configured so as to increase a life span of an electric motor. Further, Japanese Patent Application Publication No. JP (A) 2002-206423 discloses an intake air control apparatus for an internal combustion engine, which is configured so as to suppress an increase in a temperature of an electric motor, and to maintain response at a high level in control of an intake air amount.

In the abnormality detecting apparatus for a motor drive system disclosed in the Japanese Patent Application Publication No. JP (A) 2004-48875, an actual displacement amount of the drive shaft detected by the displacement amount sensor is compared to a target displacement amount of the drive shaft calculated by an electronic control unit for an engine, and feedback control of the displacement amount of the drive shaft is performed so that the actual displacement amount becomes equal to the target displacement amount.

However, when such a displacement amount sensor is used for controlling the motor drive system, it is necessary to newly provide a component that is exclusively used for the sensor, such as a component whose position is detected by the sensor. Accordingly, the number of components increases, and production cost of the apparatus increases.

SUMMARY OF THE INVENTION

It is an object of the invention to provide a position detecting apparatus for an actuator and a variable valve lift mechanism for an internal combustion engine, which make it possible to reduce the number of components and production cost.

An aspect of the invention relates to a position detecting apparatus for an actuator. The position detecting apparatus for an actuator includes a rotor in which a magnet is provided; a coil which is provided so as to face the magnet such that a magnetic field is formed between the coil and the magnet; a shaft which is connected to the rotor through a movement conversion mechanism that converts rotational movement to linear movement, and which is linearly moved in response to rotational movement of the rotor, the rotational movement being caused by energizing the coil; and a sensor portion which detects a change in magnetic flux of the magnet, the change being caused by the rotational movement of the rotor. The sensor portion obtains an amount of linear movement of the shaft based on the detected change in the magnetic flux.

In the position detecting apparatus for an actuator that is thus configured, the amount of linear movement of the shaft is indirectly obtained based on the amount of rotational movement of the rotor, whereby the position of the shaft is detected. The amount of rotational movement of the rotor is obtained using the magnet which is provided so that a magnetic field is formed between the magnet and the energized coil, and the rotor is rotated. Thus, according to the invention, it is not necessary to newly provide a sensor for directly measuring an amount of movement of the shaft, or a component whose position is detected by the sensor. Therefore, it is possible to reduce the number of components and production cost of the position detecting apparatus.

A variable valve lift mechanism for an internal combustion engine according to the invention includes one of the aforementioned position detecting apparatuses for an actuator. In the variable valve lift mechanism for an internal combustion engine that is thus configured, it is possible to accurately control the valve lift amount using the small number of components.

As described above, according to the invention, it is possible to provide the position detecting apparatus for an actuator and the variable valve lift mechanism for an internal combustion engine which make it possible to reduce the number of components and production cost.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

An embodiment of the invention will be described with reference to the accompanying drawings.

Figure 1:
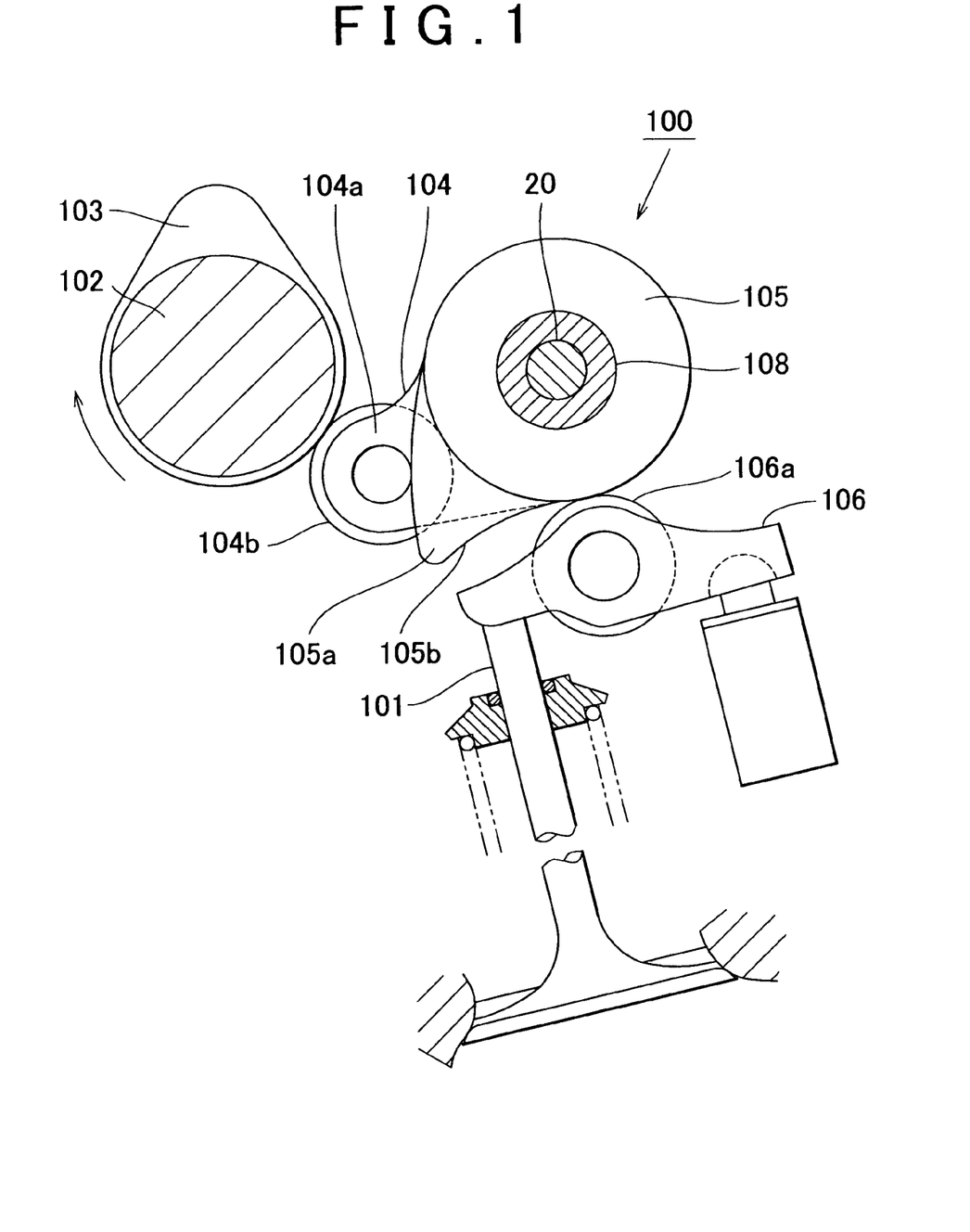
FIG. 1 is a front view showing a variable valve lift mechanism in which a position detecting apparatus according to an embodiment of the invention is used.
Figure 2:
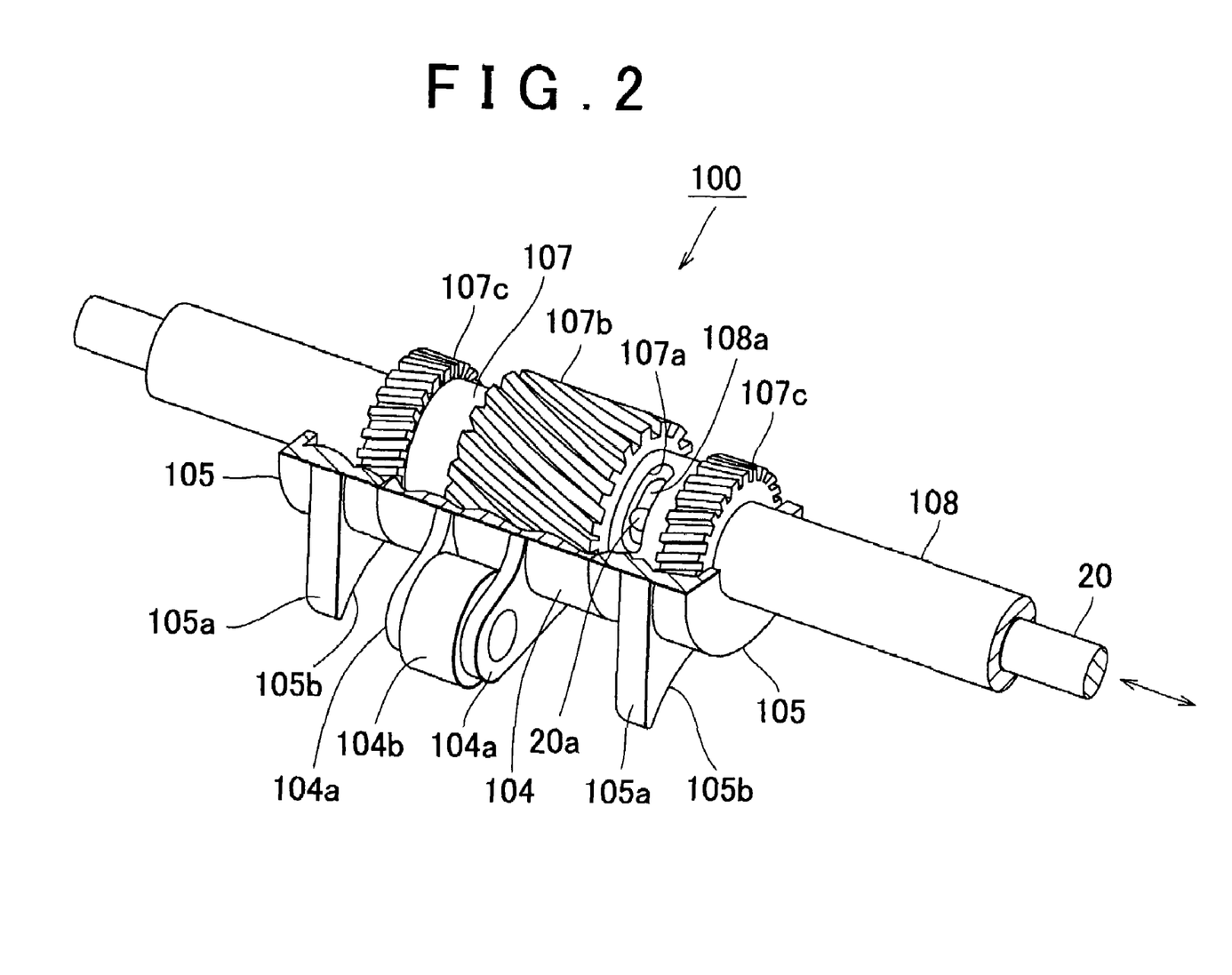
FIG. 2 is a perspective view partially showing the variable valve lift mechanism in FIG. 1.

FIG. 1 is a front view showing a variable valve lift mechanism in which a position detecting apparatus according to the embodiment of the invention is used. FIG. 2 is a perspective view partially showing the variable valve lift mechanism in FIG. 1. In FIG. 2, a part of the variable valve lift mechanism is removed so that an internal structure is clearly shown. As shown in FIG. 1 and FIG. 2, a variable valve lift mechanism 100 changes a valve lift amount of a valve (an intake valve in this embodiment) of an internal combustion engine. A motor actuator is connected to an end of a drive shaft 20 in FIG. 1 and FIG. 2, though the motor actuator is not shown in FIG. 1 and FIG. 2. The position detecting apparatus according to the embodiment is provided in the motor actuator.

The variable valve lift mechanism 100 is provided in a cylinder head of an internal combustion engine. In the cylinder head, a cam shaft 102, a rocker arm 106, and an intake valve 101 are provided. A cam 103 is formed on the cam shaft 102. The rocker arm 106 is supported such that the rocker arm 106 can be oscillated. The intake valve 101 is opened/closed according to oscillating movement of the rocker arm 106. The variable valve lift mechanism 100 includes the drive shaft 20, a support pipe 108, an input arm 104, and an oscillating cam 105. The drive shaft 20 extends in one direction. The support pipe 108 covers an outer peripheral surface of the drive shaft 20. The input arm 104 and the oscillating cam 105 are formed on an outer peripheral surface of the support pipe 108, and are arranged in parallel in an axial direction of the drive shaft 20.

In this internal combustion engine, a pair of intake valves 101 and a pair of rocker arms 106 are provided for each cylinder. The pair of intake valves 101 is opened/closed by one cam 103. In the variable valve lift mechanism 100, one input arm 104 is provided so as to correspond to one cam 103 which is provided for each cylinder. The two oscillating cams 105 are provided on both sides of the input arm 104 such that each of the two oscillating cams 105 corresponds to each of the pair of input valves 101 provided for each cylinder.

The support pipe 108 is formed so as to have a hollow cylindrical shape. The support pipe 108 is disposed in parallel with the cam shaft 102. The support pipe 108 is fixed to the cylinder head such that the support pipe 108 is prevented from being moved in an axial direction or being rotated. The drive shaft 20 is inserted in the support pipe 108 so as to be slidable in the axial direction of the drive shaft 20. The input arm 104 and the two oscillating cams 105 are provided on the outer peripheral surface of the support pipe 108 such that the input arm 104 and the oscillating cams 105 can be oscillated around a center of the drive shaft 20, and are not moved in the axial direction of the drive shaft 20.

The input arm 104 includes an arm portion 104a which outwardly protrudes; and a roller portion 104b which is rotatably connected to an end of the arm portion 104a. The input arm 104 is positioned such that the roller portion 104b can contact the cam 103.

The oscillating cam 105 includes a nose portion 105a which outwardly protrudes, and which has a substantially triangle shape. A cam surface 105b which is curved so as to have a concave shape is formed in one side of the nose portion 105a (a lower side of the nose portion 105a in FIG. 2). A valve spring is provided in the intake valve 101. A roller 106a which is rotatably fitted to the rocker arm 106 is pressed against the cam surface 105b by urging force of the valve spring.

The input arm 104 and the oscillating cam 105 are integrally oscillated around the center of the drive shaft 20. Therefore, when the cam shaft 102 is rotated, the input arm 104 which is in contact with the cam 103 is oscillated. The oscillating cam 105 is also oscillated in association with the movement of the input arm 104. The movement of the oscillating cam 105 is transmitted to the intake valve 101 through the rocker arm 106, whereby the intake valve 101 is opened/closed.

The variable valve lift mechanism 100 further includes a mechanism which changes a relative phase difference between the input arm 104 and the oscillating cam 105. A valve lift amount of the intake valve 101 is appropriately changed using this mechanism. That is, when the relative phase difference between the input arm 104 and the oscillating cam 105 is increased, the oscillation angle of the rocker arm 106 is increased in response to an increase in the relative phase difference. As a result, the valve lift amount of the intake valve 101 is increased. When the relative phase difference between the input arm 104 and the oscillating cam 105 is decreased, the oscillation angle of the rocker arm 106 is decreased in response to a decrease in the relative phase difference. As a result, the valve lift amount of the intake valve 101 is reduced.

Subsequently, the mechanism which changes the aforementioned relative phase difference will be described in more detail. Particularly, as shown in FIG. 2, a slider gear 107 is housed in a space between the input arm 104 and the two oscillating cam 105, and the outer peripheral surface of the support pipe 108. The slider gear 107 is supported by the support pipe 108 so as to be rotatable and slidable in the axial direction.

In the slider gear 107, a helical gear 107b is provided at a central portion in the axial direction of the slider gear 107. The helical gear 107b is a right-hand helical gear which serves as a helical spline. Also, in the slider gear 107, helical gears 107c are provided on both sides of the helical gear 107b. Each of the helical gears 107c is a left-hand helical gear which serves as a helical spline.

Meanwhile, helical splines corresponding to the respective helical gears 107b and 107c are formed on surfaces of the input arm 104 and the two oscillating cams 105, the surfaces defining a space in which the slider gear 107 is housed. That is, a right-hand helical spline is formed in the input arm 104, and the helical spline is engaged with the helical gear 107b. Also, a left-hand helical spline is formed in each of the oscillating cams 105, and the helical spline is engaged with each of the helical gears 107c.

Further, in the slider gear 107, a long hole 107a is formed between one of the helical gears 107c and the helical gear 107b. The long hole 107a extends in a circumferential direction. Also, a long hole 108a is formed in the support pipe 108. The long hole 108a extends in the axial direction so as to be overlapped with a part of the long hole 107a. A holding pin 20a is integrally formed on the drive shaft 20 which is inserted in the support pipe 108. The holding pin 20a protrudes through a portion where the two long holes 107a and 108a are overlapped with each other.

When the drive shaft 20 is moved in the axial direction thereof, the slider gear 107 is pushed by the holding pin 20a. Therefore, the helical gears 107b and 107c are moved in the axial direction of the drive shaft 20 at the same time. When the helical gears 107b and 107c are moved in this manner, the input arm 104 and the oscillating cams 105 that are engaged with the helical gears 107b and 107c through the helical splines are oscillated around the center of the drive shaft 20, since the input arm 104 and the oscillating cams 105 are not moved in the axial direction. At this time, since the direction of the helical spline formed in the input arm 104 is opposite to the direction of the helical spline formed in each of the oscillating cams 105, the input arm 104 is oscillated in a direction opposite to a direction in which the oscillating cams 105 are oscillated. Thus, the relative phase difference between the input arm 104 and the oscillating cams 105 is changed. As a result, the valve lift amount of the intake valve 101 is changed as described above.

Figure 3:
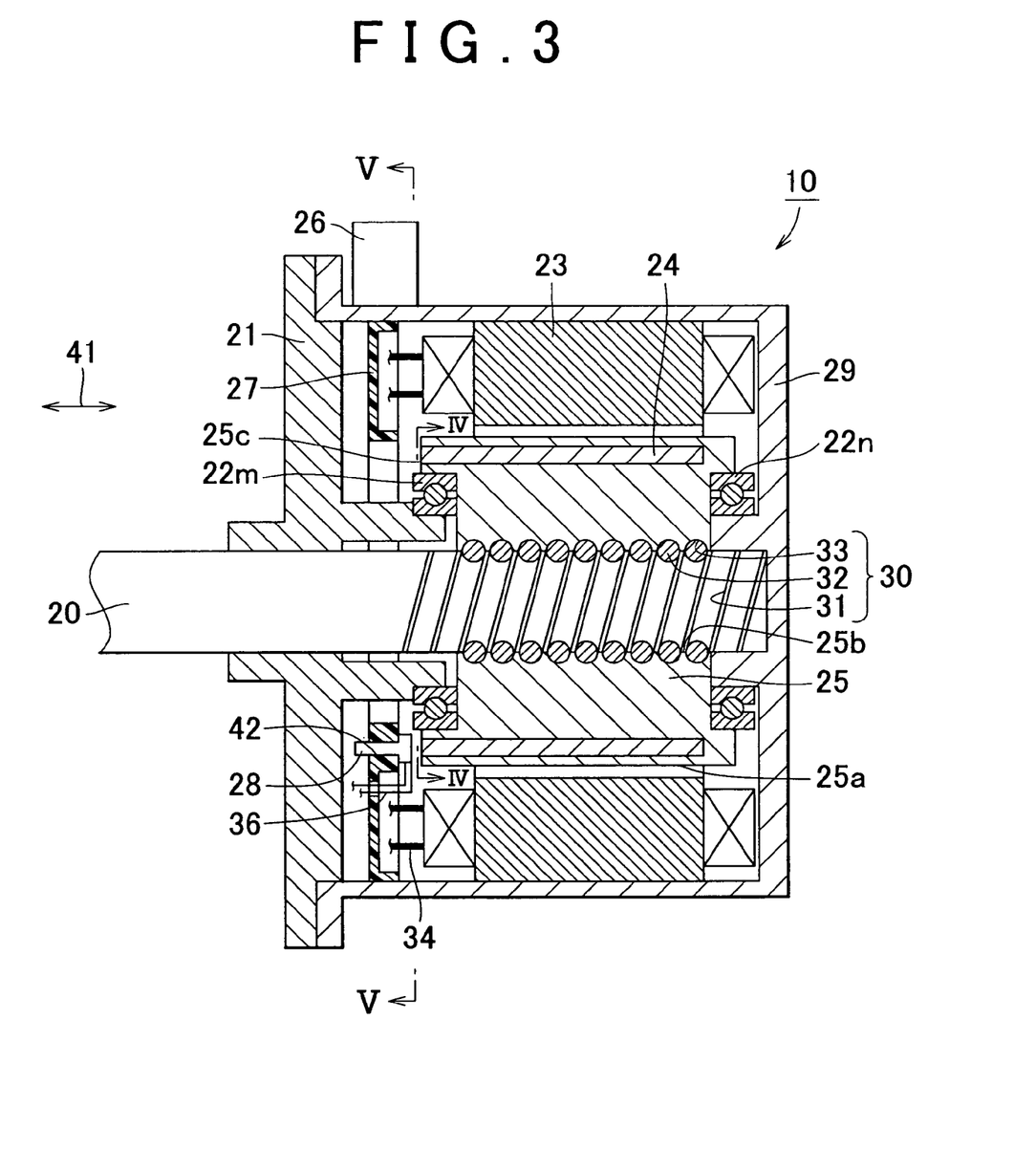
FIG. 3 is a sectional view showing the position detecting apparatus for a motor actuator according to the embodiment of the invention.

FIG. 3 is a sectional view showing the position detecting apparatus for a motor actuator according to the embodiment of the invention. As shown in FIG. 3, a motor actuator 10 is provided at an end side of the drive shaft 20 in order to linearly move the drive shaft 20 in the axial direction thereof (i.e., in a direction indicated by an arrow 41). The motor actuator 10 includes the drive shaft 20; a linear movement mechanism nut 25 which is connected to the drive shaft 20 through a ball screw 30, and which is provided so as to be rotatable around the center of the drive shaft 20; and a coil 23 which is provided around the linear movement mechanism nut 25, and which constitutes a stator assembly. The motor actuator 10 further includes magnets 24 provided in the linear movement mechanism nut 25; and a magnetic flux detection rotational angle sensor 28 which detects a change in magnetic flux of the magnet 24, the change caused by rotation of the linear movement mechanism nut 25.

A yoke 29 and a frame 21 are provided at the end side of the drive shaft 20. A bearing 22n is fitted to the yoke 29. A bearing 22m is fitted to the frame 21, and the frame 21 is fixed to the yoke 29. The linear movement mechanism nut 25 is provided so as to be rotatable around the drive shaft 20 while being supported by the bearings 22m and 22n at both ends thereof. The linear movement mechanism nut 25 is formed so as to have a cylindrical shape. The linear movement mechanism nut 25 includes an inner peripheral surface 25b, and an outer peripheral surface 25a which is on a reverse side of the inner peripheral surface 25b. The drive shaft 20 is inserted in the linear movement mechanism nut 25. The inner peripheral surface 25b faces the outer peripheral surface of the drive shaft 20. The coil 23 has a ring shape, and is provided around the linear movement mechanism nut 25 such that a space is formed between the coil 23 and the outer peripheral surface 25a. A connector 26 is fitted to an outer peripheral surface of the yoke 29.

A groove 33 having a helical shape is formed on the inner peripheral surface 25b of the linear movement mechanism nut 25. A groove 31 having a helical shape is formed on the outer peripheral surface of the drive shaft 20, which faces the inner peripheral surface 25b. The groove formed on the inner peripheral surface of the linear movement mechanism nut 25, the groove formed on the outer peripheral surface of the drive shaft 20, and plural balls 32 constitute the ball screw 30. With this configuration, when the linear movement mechanism nut 25 is rotated, the rotational movement of the linear movement mechanism nut 25 is transmitted to the drive shaft 20 through the ball screw 30, and the drive shaft is linearly moved in the predetermined direction indicated by the arrow 41.

Figure 4:
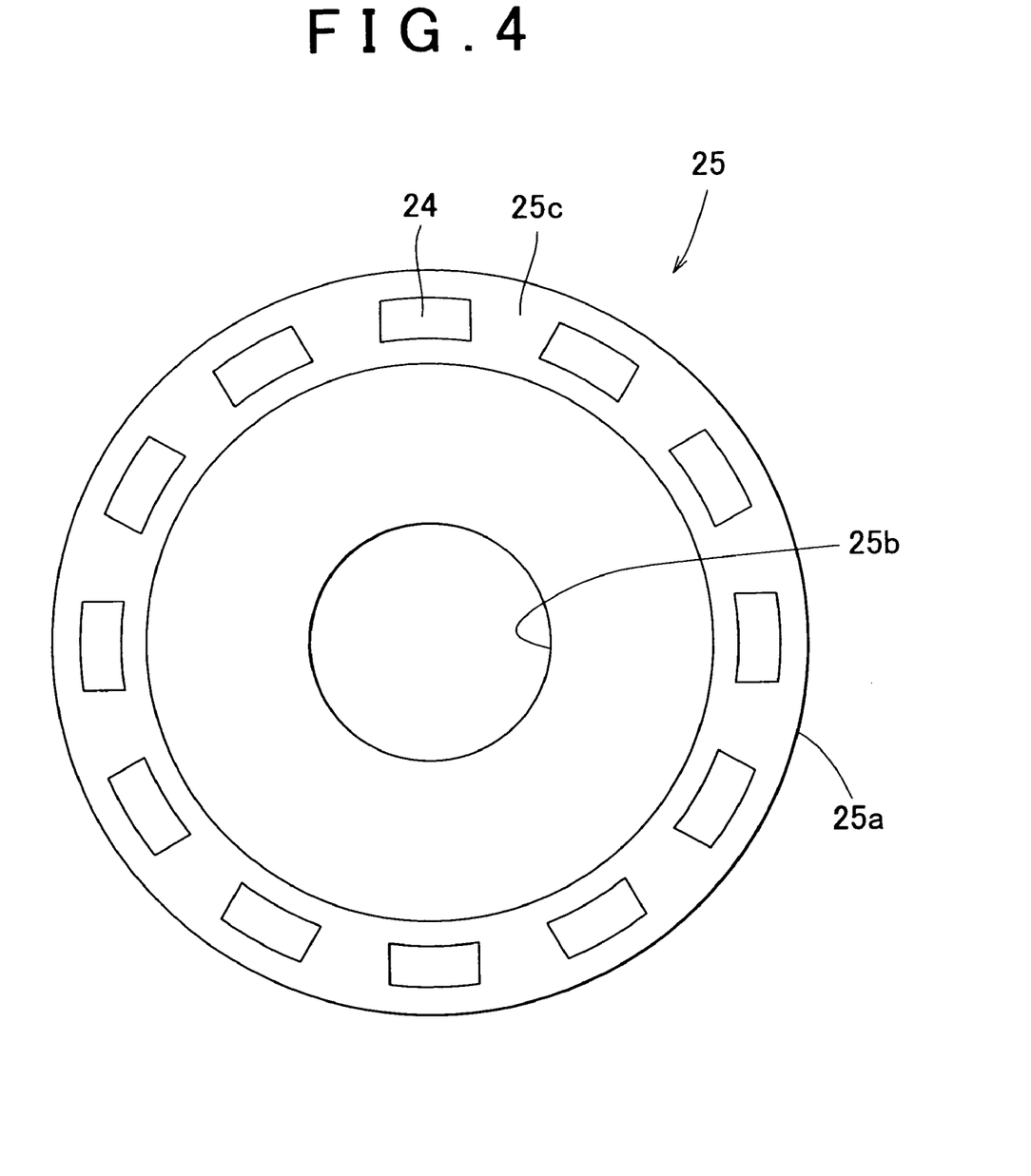
FIG. 4 is a front view showing a linear movement mechanism nut taken along line IV—IV in FIG. 3.

FIG. 4 is a front view showing a linear movement mechanism nut taken along line IV—IV in FIG. 3. As shown in FIG. 3 and FIG. 4, in the linear movement mechanism nut 25, the plural magnets 24 are buried at a predetermined depth with respect to the outer peripheral surface 25a. The magnets 24 are provided on a predetermined pitch circle whose center is the center of the drive shaft 20 at intervals of a predetermined angle. In this embodiment, twelve magnets 24 are provided at intervals of 30 degrees. The plural magnets 24 are provided in the circumferential direction of the outer peripheral surface 25a so as to face the coil 23.

Figure 5:
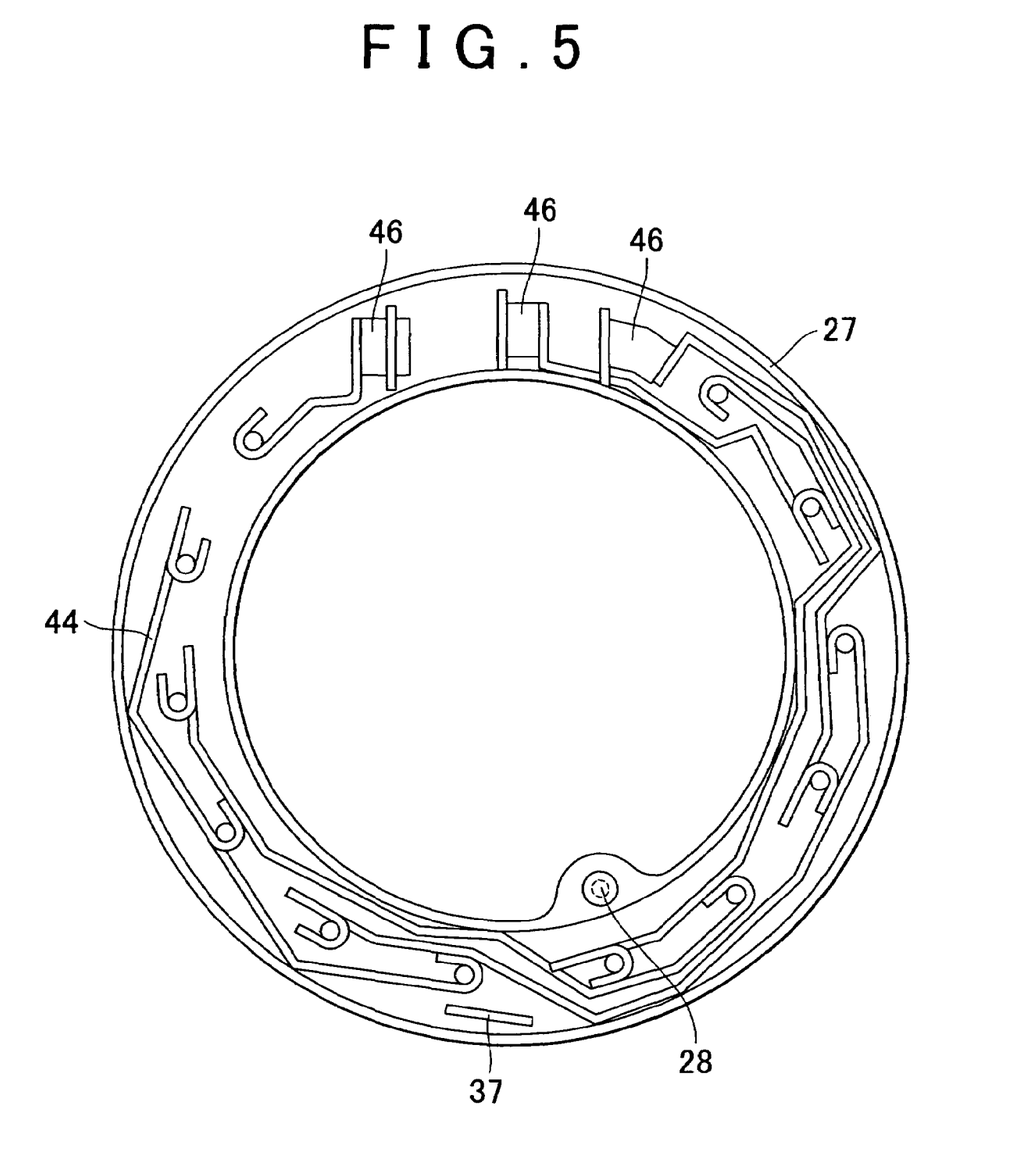
FIG. 5 is a front view showing a bus bar housing taken along line V—V in FIG. 3.

FIG. 5 is a front view showing a bus bar housing taken along line V—V in FIG. 3. As shown in FIG. 3 and FIG. 5, a bus bar housing 27 made of resin is fixed to the yoke 29 in a space surrounded by the yoke 29 and the frame 21. The bus bar housing 27 having a ring shape is provided so as to face the coil 23. Plural bus bars 44 are fitted to the bus bar housing 27. Cables extending from the coil 23 are connected to the bus bars 44. A power line connection portion 46 is provided at an end portion of each bus bar 44. A power line extending from the outside is connected to the power line connection portion 46. Electric current is supplied to the coil 23 from the outside through this power line connection portion 46. When electric current is supplied to the coil 23, a magnetic field is generated between the coil 23 and the magnets 24, and the linear movement mechanism nut 25 is rotated.

Thus, in this embodiment, the motor is basically configured as an inner rotor type brushless motor. Further, the linear movement mechanism nut 25 in which the groove 33 of the ball screw 30 is formed serves as a rotor of the motor. Therefore, it is possible to reduce rotational inertia (rotational moment) of the motor actuator 10, and to improve response thereof. Also, it is possible to decrease the number of components, and to reduce the production cost of the motor actuator 10. Further, it is possible to employ the motor actuator 10 in various types of internal combustion engines whose valve lift amounts of intake valves are different from each other, only by changing a lead of the ball screw.

The magnetic flux detection rotational angle sensor 28 is pressed into a fitting hole 42 formed in the bus bar housing 27. The magnetic flux detection rotational angle sensor 28 is configured so as to include a hall element and a magnetic resistance element (MRE). The aforementioned elements for detecting magnetic flux are provided in the magnetic flux detection rotational angle sensor 28 on a side facing the linear movement mechanism nut 25. Also, the aforementioned elements for detecting magnetic flux are provided so as to face a portion of the pitch circle on which the magnets 24 are buried. A cable 36 extending from the magnetic flux detection rotational angle sensor 28 is connected to a signal line and the like extending from the outside, through a sensor-terminal 37 which is provided in the bus bar housing 27. With this configuration, in this embodiment, cables for the motor and the sensor are intensively connected to the bus bar housing 27.

Each of the magnets 24 has a bar shape, and extends in parallel with the center of the drive shaft 20. The magnet 24 is buried in the linear movement mechanism nut 25 such that the magnetic flux detection rotational angle sensor 28 is closer to a center position of the magnet 24 in a direction in which the magnet 24 extends than to a center position of the coil 23 in the same direction. As a result, the magnet 24 is exposed at a lateral surface 25c of the linear movement mechanism nut 25, which faces the magnetic flux detection rotational angle sensor 28. No obstacle is between the magnetic flux detection rotational angle sensor 28 and the magnet 24. With this configuration, the magnetic flux detection rotational angle sensor 28 can more accurately detect the change in the magnetic flux of the magnet 24. Also, the magnetic flux detection rotational angle sensor 28 is provided so as to face the magnet 24 while the linear movement mechanism nut 25 is rotated. Thus, the magnetic flux detection rotational angle sensor 28 is closest to the magnet 24 as possible. Therefore, the magnetic flux detection rotational angle sensor 28 can accurately detect the change in the magnetic flux.

Figure 6:
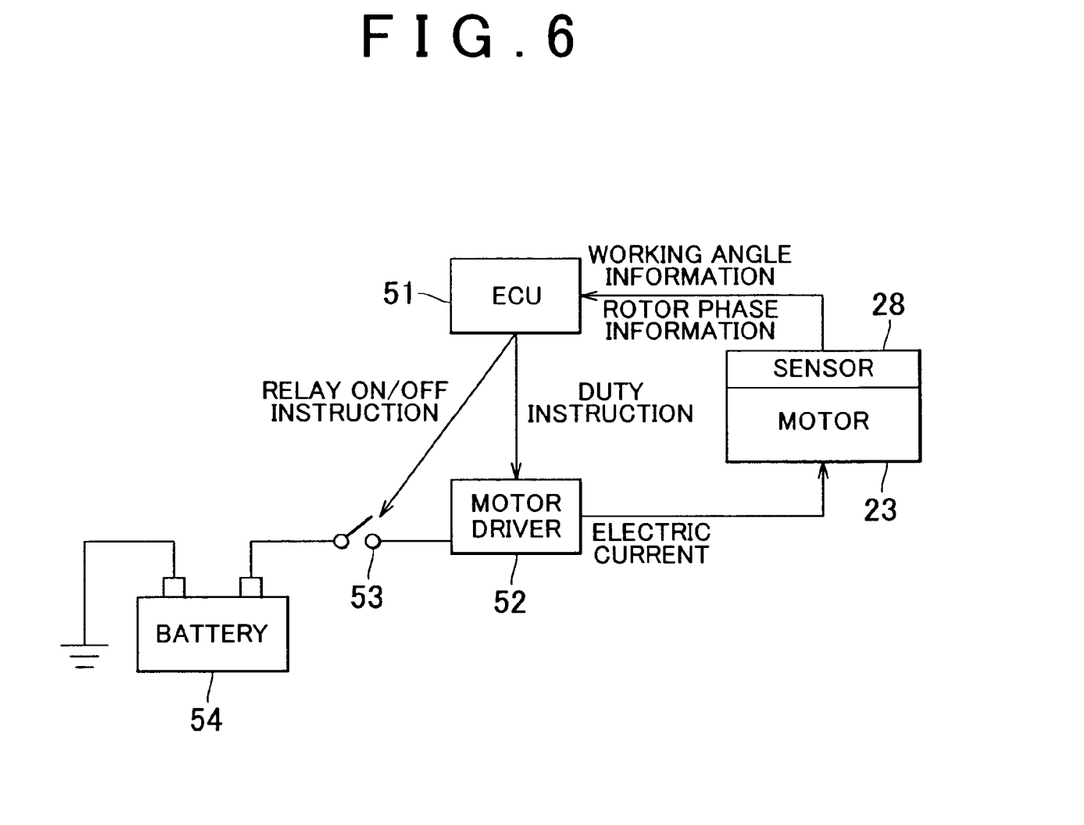
FIG. 6 is a schematic view showing a control system of the position detecting apparatus for a motor actuator shown in FIG. 3.
Figure 7:
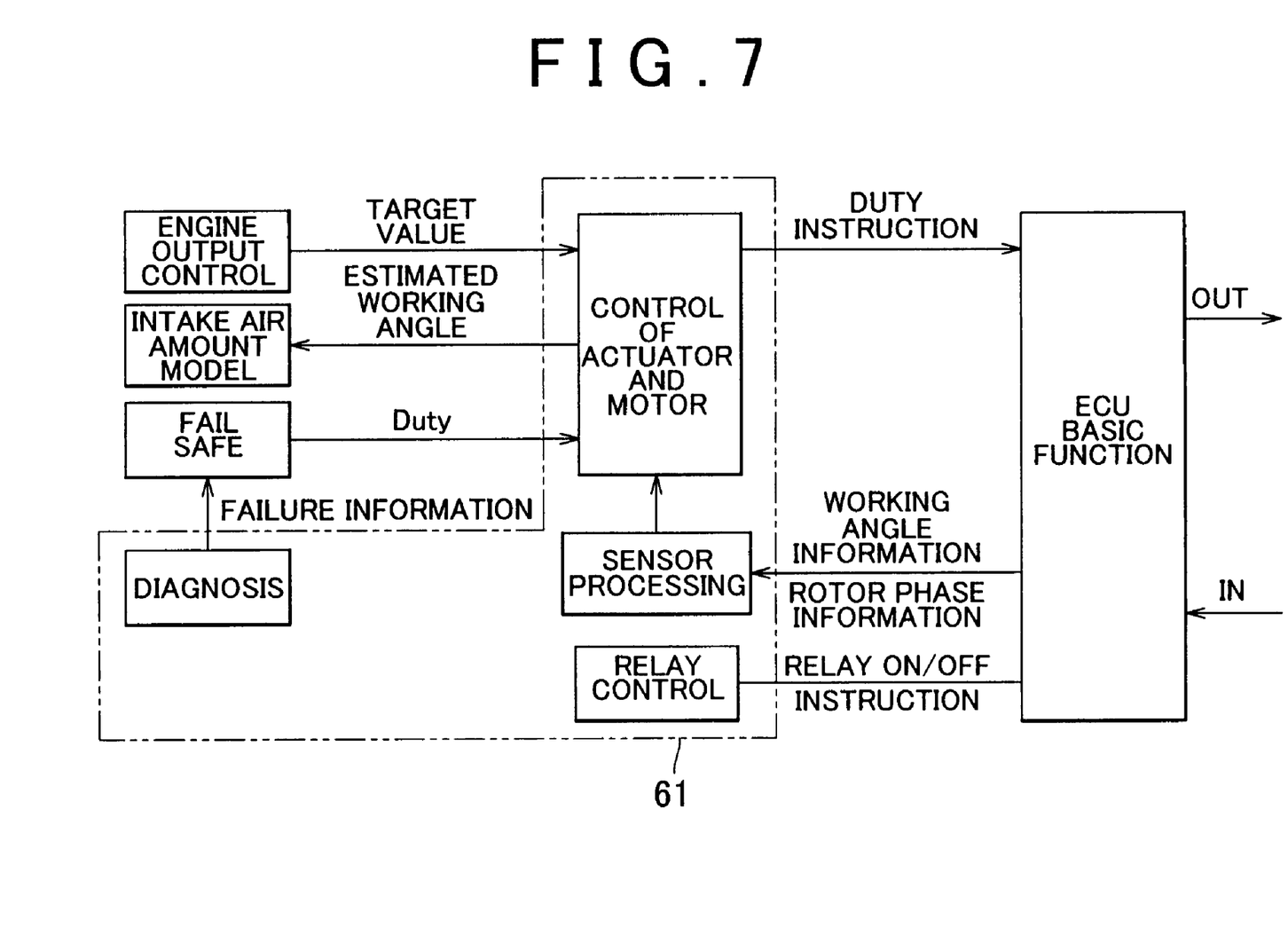
FIG. 7 is an explanatory diagram showing an outline of a logic of an operation performed by an ECU in FIG. 6.

FIG. 6 is a schematic view showing a control system of the position detecting apparatus for a motor actuator shown in FIG. 3. FIG. 7 is an explanatory diagram showing an outline of a logic of an operation performed by an ECU (engine control unit) in FIG. 6. In FIG. 7, portions relating to information received from the magnetic flux detection rotational angle sensor 28 are surrounded by a chain double dashed line 61. As shown in FIG. 6 and FIG. 7, when the magnetic flux detection rotational angle sensor 28 detects the change in magnetic flux of the magnet 24, which is caused by rotation of the linear movement mechanism nut 25, information on a working angle (rotational angle) of the linear movement mechanism nut 25 based on the change in the magnetic flux and information on the phase of the linear movement mechanism nut 25 are transmitted to the ECU (engine control unit) 51.

The ECU 51 calculates an amount of linear movement of the drive shaft 20 based on the lead of the ball screw 30 and the like using the transmitted information. Further, the ECU 51 calculates an actual valve lift amount of the intake valve 101 based on the amount of linear movement. A value of drive electric current for driving the motor is decided so that the calculated valve lift amount becomes equal to a target valve lift amount indicated by an engine output control device. The value of drive electric current for driving the motor is transmitted to a motor driver 52 as a duty instruction. On the basis of the instruction, predetermined drive electric current is supplied to the coil 23 from a battery 64. In addition, the ECU 51 gives a relay on/off instruction for turning on/off a relay, to a relay 53 provided between the battery 64 and the motor driver 52.

Since this control is repeatedly performed while an internal combustion engine is operated, the valve lift amount of the intake valve 101 shown in FIG. 1 is continuously adjusted to an optimal value.

The position detecting apparatus for the motor actuator 10 according to the embodiment of the invention includes the linear movement mechanism nut 25; the coil 23; the drive shaft 20; and the magnetic flux detection rotational angle sensor 28. The linear movement mechanism nut 25 serves as the rotor in which the magnets 24 are provided. The coil 23 is provided so as to face the magnets 24 such that a magnetic field is formed between the coil 23 and the magnets 24. The drive shaft 20 serves as the shaft which is connected to the linear movement mechanism nut 25 through the ball screw 30 serving as the movement conversion mechanism that converts rotational movement to linear movement, and which is linearly moved in response to rotational movement of the linear movement mechanism nut 25, the rotational movement being caused by energizing the coil 23. The magnetic flux detection rotational angle sensor 28 serves as the sensor portion which detects a change in magnetic flux of the magnet 24, the change being caused by the rotational movement of the linear movement mechanism nut 25, and which obtains an amount of linear movement of the drive shaft 20 based on the detected change in the magnetic flux.

An amount of movement of a position where the magnet 24 is provided per unit time is larger than an amount of movement of the drive shaft 20 per unit time. In this embodiment, for example, in a case where the rotational speed of the linear movement mechanism nut 25 is 10 rpm, the lead of the ball screw 30 is 10 mm, and a diameter of the pitch circle on which the magnets 24 are provided is 50 mm, the amount of movement of the position where the magnet 24 is provided per unit time of 1 second is approximately 26.2 mm, and the amount of movement of the drive shaft 20 per unit time of 1 second is approximately 1.7 mm. Thus, the magnetic flux detection rotational angle sensor 28 detects the change in the magnetic flux of the magnet 24 provided in the linear movement mechanism nut 25 whose movement amount is larger than that of the drive shaft 20, instead of directly detecting the movement amount of the drive shaft 20. Accordingly, it is possible to accurately perform position detection even when the magnetic flux detection rotational angle sensor 28 has rough accuracy.

In this embodiment, description has been made of a case where the position detecting apparatus according to the invention is applied to the variable valve lift mechanism for an internal combustion engine. However, the invention is not limited to this case. The invention can be applied to various actuators which convert rotational movement to linear movement. Also, in this embodiment, the ball screw 30 serving as the movement conversion mechanism is employed. However, the invention is not limited to this screw. For example, a feed screw such as a trapezoidal feed screw, or other mechanism may be used. Also, the internal combustion engine in which the position detecting apparatus according to the invention is used may be a gasoline engine or a diesel engine.

In the position detecting apparatus for the motor actuator 10 and the variable valve lift mechanism 100 that are thus configured according to the embodiment of the invention, the position of the drive shaft 20 is detected using the magnets 24 which are buried in the linear movement mechanism nut 25 functioning as the rotor, and which constitute the motor together with the coil 23. Therefore, it is not necessary to newly provide another magnet, another rotor, or the like in order to detect the position of the drive shaft 20. Thus, it is possible to reduce the number of components of the motor actuator 10. Accordingly, it is possible to reduce the production cost of the variable valve lift mechanism 100.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A position detecting apparatus for an actuator, comprising:
   a rotor in which plural magnets are provided on a predetermined pitch circle whose center is a center of a drive shaft, the plural magnets being provided at intervals of a predetermined angle;
   a coil which is provided so as to face the magnet such that a magnetic field is formed between the coil and the magnet;
   a shaft which is connected to the rotor through a movement conversion mechanism that converts rotational movement to linear movement, and which is linearly moved in response to rotational movement of the rotor, the rotational movement being caused by energizing the coil; and a sensor portion which detects a change in magnetic flux of the magnet, the change being caused by the rotational movement of the rotor, and which obtains an amount of linear movement of the shaft based on the detected change in the magnetic flux, wherein the magnets are buried in the rotor so as to be exposed on an end portion of the rotor, the end portion facing the sensor portion.

2. The position detecting apparatus according to claim 1, wherein the coil and the magnets extend in a predetermined direction from a position close to the sensor portion to a position far from the sensor portion, and the sensor portion is closer to a center position of the magnets in the predetermined direction than to a center position of the coil in the predetermined direction.

3. The position detecting apparatus according to claim 1, wherein the coil and the magnets extend in a first direction in which the shaft is moved, and the sensor portion is closer to a center position of the magnets in the first direction than to a center position of the coil in the first direction.

4. The position detecting apparatus according to claim 1, wherein when the rotor is rotated, an amount of movement of a position where the magnets are provided per unit time is larger than an amount of movement of the shaft per unit time.

5. The position detecting apparatus according to claim 1, wherein the movement conversion mechanism is one of a ball screw and a feed screw.

6. The position detecting apparatus according to claim 1, wherein the magnets have a bar shape, the sensor portion is separated from the magnets, and the sensor portion is provided so as to face the magnets while the rotor is rotated.

7. A variable valve lift mechanism for an internal combustion engine, comprising:

the position detecting apparatus according to claim 1.

8. The position detecting apparatus according to claim 1, wherein the actuator further comprises a bus bar housing in which plural bus bars are fitted to the bus bar housing and cables extending from the coil are connected to the bus bars.

* * * * *